United States Patent
Potak

(10) Patent No.: US 7,353,628 B2
(45) Date of Patent: Apr. 8, 2008

(54) PLOW MOUNTING APPARATUS AND METHOD

(75) Inventor: Robert L. Potak, Strongsville, OH (US)

(73) Assignee: Louis Berkman Winter Products Company, Cleveland, OH (US)

( * ) Notice: Subject to any disclaimer, the term of this patent is extended or adjusted under 35 U.S.C. 154(b) by 227 days.

(21) Appl. No.: 10/925,858

(22) Filed: Aug. 25, 2004

(65) Prior Publication Data

US 2005/0144814 A1 Jul. 7, 2005

Related U.S. Application Data

(62) Division of application No. 10/638,642, filed on Aug. 11, 2003, now Pat. No. 7,114,270.

(60) Provisional application No. 60/442,275, filed on Jan. 24, 2003.

(51) Int. Cl.
*E01H 5/04* (2006.01)

(52) U.S. Cl. .................... 37/231; 37/236; 172/272; 172/817

(58) Field of Classification Search ........... 37/231, 37/234, 235, 236, 270, 271, 266; 172/272, 172/274, 275, 212, 395, 810, 811, 817
See application file for complete search history.

(56) References Cited

U.S. PATENT DOCUMENTS

| | | | |
|---|---|---|---|
| 3,412,489 A | 11/1968 | Klapprodt et al. | |
| 3,528,685 A | 9/1970 | Eastman | |
| 3,760,883 A | 9/1973 | Birk | |
| 3,876,092 A | 4/1975 | MacDonald | |
| 4,236,329 A | 12/1980 | Hetrick | |
| 4,462,172 A | 7/1984 | Caron | |
| 4,799,563 A | 1/1989 | Yukino | |
| 4,821,436 A | 4/1989 | Slocum | |
| 4,976,054 A | 12/1990 | Jones | |
| 5,050,321 A | 9/1991 | Evans | |
| 5,081,775 A | 1/1992 | Veilleux | |
| 5,082,065 A * | 1/1992 | Fletcher | 172/273 |
| 5,136,795 A * | 8/1992 | Rosenberg | 37/233 |
| 5,242,258 A | 9/1993 | Weyer | |
| 5,415,235 A | 5/1995 | Gebauer | |
| 5,743,339 A | 4/1998 | Alexander, III | |
| 5,909,960 A * | 6/1999 | Jager et al. | 37/235 |

(Continued)

FOREIGN PATENT DOCUMENTS

DE 1 947 581 A1 3/1971

(Continued)

OTHER PUBLICATIONS

European Search Report corresponding to European Application No. 04 000 980.5.

*Primary Examiner*—Thomas A Beach
(74) *Attorney, Agent, or Firm*—Brouse McDowell; Roger Emerson; Timothy Bennett

(57) ABSTRACT

A plow mounting assembly is provided for removably attaching a plow blade to the front end of a vehicle. The plow mounting assembly includes a frame assembly semi-permanently connected to a front end of an associated vehicle. A blade assembly includes a plow blade and a grasping assembly in a closed position removably connected to the frame assembly.

14 Claims, 9 Drawing Sheets

U.S. PATENT DOCUMENTS

| | | | |
|---|---|---|---|
| 5,960,569 A * | 10/1999 | Molstad | 37/231 |
| 6,050,008 A * | 4/2000 | Doornek et al. | 37/231 |
| 6,151,808 A | 11/2000 | Curtis | |
| 6,209,231 B1 | 4/2001 | Curtis | |
| 6,240,659 B1 | 6/2001 | Curtis et al. | |
| 6,354,024 B1 | 3/2002 | Kost et al. | |
| 6,594,923 B1 * | 7/2003 | Kost et al. | 37/231 |
| 6,711,837 B2 | 3/2004 | Bloxdorf et al. | |
| 6,957,505 B1 * | 10/2005 | Moffitt | 37/231 |
| 6,964,121 B2 * | 11/2005 | Harris | 37/231 |
| 7,114,270 B2 * | 10/2006 | Potak | 37/231 |
| 2002/0152648 A1 | 10/2002 | Curtis | |

FOREIGN PATENT DOCUMENTS

| | | |
|---|---|---|
| EP | 1 050 626 A2 | 11/2000 |

\* cited by examiner

PLOW MOUNTING APPARATUS AND METHOD

This application is a divisional application of U.S. patent application Ser. No. 10/638,642 now U.S. Pat. No. 7,114,270 entitled "PLOW MOUNTING APPARATUS AND METHOD" and filed on Aug. 11, 2003 which claims the benefit of U.S. Provisional Patent Application Ser. No. 60/442,275 entitled "PLOW MOUNTING DEVICE" and filed on Jan. 24, 2003, both expressly incorporated herein by reference.

BACKGROUND OF THE INVENTION

1. Field of the Invention

The present invention relates to a mounting device for attaching an implement, such as a plow mechanism, rotary broom mechanism or other such heavy implements to the front end of a vehicle. More particularly, the present invention relates to (1) a mounting device that allows an implement to be removably connected to a front end of a vehicle without the use of pins or levers, (2) a self-aligning mounting device that centers an implement on the front of a vehicle and/or (3) a mounting device that allows an implement to rotate or float to a position parallel with a surface below said implement. The present invention finds particular application as a snow plow mounting apparatus and method and will be described with particular reference thereto. It is to be appreciated, however, that the present invention may relate to other similar environments and applications including other types of implements that can be mounted to a vehicle.

2. Discussion of the Art

Many vehicle owners have plow blades attached to the front ends of their vehicles. Often, a plow blade is removably or detachably mounted to the front end of a vehicle so that the plow blade can be selectively detached from the vehicle and stored on the ground when not in use and selectively attached or reattached to the vehicle when the vehicle operator anticipates that plowing may be desired. "Ground," as used herein, refers to any supporting surface that the plow blade rests upon, including, for example, a garage floor, a generally solid surface of the earth, a paved area or road, etc.

Assemblies and mounting devices for removably attaching a plow blade to the front end of a vehicle are well known. Typically, these assemblies include a frame assembly semi-permanently connected to the vehicle or, more specifically, the chassis of the vehicle. "Semi-permanently connected," as used herein, refers to a connection that does not have to be broken each time the plow blade is detached from the vehicle. The plow blade is often connected to a blade assembly. The blade assembly is selectively engaged or connected to the frame assembly for mounting the blade to the vehicle. A lift assembly is often provided for lifting or positioning the relatively heavy plow blade relative to the vehicle.

One common connecting means and method used to connect the blade assembly and the frame assembly is the insertion of one or more pins through aligned holes on the frame assembly and the blade assembly. For example, with reference to U.S. Pat. No. 5,081,775 issued to Veilleux on Jan. 21, 1992, expressly incorporated herein by reference, a blade having an A-frame blade assembly is connected to brackets on the front end of a vehicle using pins extending through aligned holes. An adjustable lift arm is connected to a bracket assembly attached to the front of the vehicle. A link chain connects the blade assembly to the lift arm. The lift arm includes a hydraulic lift adapted to raise and suspend the blade assembly while the pins are inserted through the aligned holes.

Another-example is U.S. Pat. No. 5,050,321 issued to Evans on Sep. 24, 1991, expressly incorporated herein by reference. The '321 patent discloses an attaching structure semi-permanently mounted to the front end of a vehicle and a snow plow moldboard structure including a plow blade releasably connectable to the attaching structure. Specifically, the attaching structure includes a pivot arm movable by a hydraulic lift. The pivot arm is connected to the moldboard structure by chains and is capable of lifting the moldboard structure when the hydraulic lift is actuated. When lifted, the moldboard structure is further connectable to the attaching structure by aligning one vertically spaced hole on the attaching structure to a hole on the moldboard structure and inserting a pushpin through the aligned holes.

The use of pins to connect the blade assembly to the frame assembly has been recognized as being difficult and tedious. Accordingly, numerous inventions have been directed toward facilitating the pin connection or replacing the pin connection altogether. For example, U.S. Pat. Nos. 6,151,808 and 6,240,659, issued to Curtis on, respectively, Nov. 28, 2000 and Jun. 5, 2001, both expressly incorporated herein by reference, disclose a jack and a control system for the jack for allowing proper vertical alignment of a lift frame having a plow blade relative to a receiver frame semi-permanently connected to a vehicle. Another patent, U.S. Pat. No. 4,976,054 issued to Jones on Dec. 11, 1990 and expressly incorporated herein by reference, discloses a leveling system for a snowplow blade.

Despite prior art attempts to facilitate the attachment of a plow blade to a vehicle, there remains a need for a plow-mounting device that allows a plow blade to be removably connected to a vehicle with relative ease. Any improved plow mounting device that provides a relatively quick and easy connection and/or facilitates in aligning the plow blade on the vehicle is deemed particularly desirable. Further, there is a need for a plow-mounting device that allows a plow blade to rotate or float relative to a vehicle so that the plow blade can follow the contour of a surface being plowed.

THE INVENTION

The present invention provides a new and improved plow mounting assembly that overcomes the foregoing difficulties and others and provides the aforementioned and other advantageous features. More particularly, in accordance with one aspect of the present invention, a plow mounting assembly is provided for releasably connecting a plow blade to a vehicle. In accordance with this aspect of the invention, mounting assembly includes a frame semi-permanently mounted on the vehicle. The frame has a first portion and a second portion spaced from the first portion a preselected distance. A blade assembly includes a plow frame member and a plow blade pivotally connected to the frame member allowing the plow blade to be positioned at varying angles relative to a front of a vehicle when the plow blade is connected to the vehicle. A lift bar is pivotally connected to the frame member allowing the plow blade to float to a position generally parallel with the ground when the plow blade is connected to the vehicle. An engaging member is pivotally connected to the lift bar allowing the plow blade to be positioned at varying distances from the ground.

A pair of spaced first hooks are adjacent the engaging member. A pair of second hooks are spaced apart from the pair of first hooks. A hydraulic cylinder is between the first and second pair of hooks. The cylinder is movable between an open position and a closed position. In the open position, the first and second hooks are spaced apart a distance sufficient to allow the frame to move to and from a position adjacent the cylinder wherein the lower and upper hooks are aligned with the first and second portions of the frame. When the cylinder is moved from the open position to the closed position with the frame in the position adjacent the cylinder the lower and upper hooks grasp the first and second portions of the frame. When the frame is grasped and the cylinder is in the closed position, the plow blade is mounted to the vehicle.

In accordance with another aspect of the present invention, a plow mounting assembly is provided for removably attaching a plow blade to the front end of a vehicle. More particularly, in accordance with this aspect of the invention, the plow mounting assembly includes a frame assembly semi-permanently connected to a front end of an associated vehicle. A blade assembly includes a plow blade and a grasping assembly in a closed position removably connected to the frame assembly.

In accordance with yet another aspect of the present invention, a plow mounting assembly is provided for selectively connecting, disconnecting and reconnecting a plow blade to a vehicle. More particularly, in accordance with this aspect of the present invention, the mounting assembly includes a frame semi-permanently mounted on the vehicle and a plow frame member. A plow blade is pivotally connected to the plow frame member allowing the plow blade to be positioned at varying angles relative to a front of a vehicle when the plow blade is connected to the vehicle. A lift bar is pivotally connected to the frame member allowing the plow blade to float to a position generally parallel with the ground when the plow blade is connected to the vehicle. An engaging member is pivotally connected to the lift bar allowing the plow blade to be positioned at varying distances from the ground. A first clamp is connected to the engaging member and a second clamp is spaced from the first clamp. A hydraulic cylinder is between the first and second clamps and selectively movable between an open position and a closed position. In the open position, the first and second clamps are spaced a sufficient distance apart to allow the frame semi-permanently mounted on the vehicle to move to a first position between the clamps and a second position away from the clamps. In the closed position, the first and second clamps are capable of holding the frame when the frame is in the first position between the clamps to thereby connect the plow blade to the vehicle.

In accordance with still another aspect of the present invention, a method of releasably mounting a plow blade to a vehicle is provided wherein the vehicle has a frame assembly semi-permanently mounted thereon and the plow blade forms part of a blade assembly that releasably connects to the frame assembly. In accordance with this aspect of the invention, the frame assembly mounted on the vehicle is positioned between expanded first and second clamps of the blade assembly. The clamps are moved toward a closed position. The frame assembly is grasped with the first and second clamps.

In accordance with still yet another aspect of the present invention, a plow blade mount is provided. More particularly, in accordance with this aspect of the invention, a vertical element is affixed to a vehicle frame with a top member and a bottom member. A grasping assembly is fixed to a plow blade. The grasping assembly has upper hook members, lower hook members on a horizontal base and a hydraulic cylinder for selectively moving the upper and lower hook members (1) together to capture the vertical Element between the top and bottom members and (2) apart to release the vertical element with the horizontal base contacting the ground.

In accordance with another aspect of the present invention, a blade assembly having a plow blade mounted thereto is provided. The blade assembly is adapted to be removably mounted to the front end of a vehicle. More particularly, in accordance with this aspect of the invention, the blade assembly includes a plow frame member and a first pivot connection connecting the plow frame member to a vehicle mounting assembly for allowing the plow blade to pivot up and down relative to vehicle mounting assembly. The vehicle mounting assembly is adapted to connect the plow frame member to the front end of an associated vehicle. A second pivot connection connects a plow blade to the plow frame member for allowing the plow blade to pivot from side to side relative to the plow frame member. A third pivot connection connects the plow frame member to the mounting assembly. The third pivot connection is oriented generally perpendicularly relative to a second pivot connection for allowing the plow blade to rotatably move relative to the mounting assembly to a generally level position.

In accordance with yet another aspect of the present invention, an assembly having a plow blade connected thereto is provided. More particularly, in accordance with this aspect of the invention, the assembly includes a mounting beam attached to a non-plowing surface of an associated plow blade. A frame member is pivotally connected to the mounting beam and oriented generally perpendicular relative to the height of the associated plow blade. The mounting beam is movable relative to the frame member about a first pivot axis parallel to the height of the associated plow blade. A lift bar is pivotally connected to the frame member. The frame assembly is movable relative to the lift bar about a second pivot axis parallel to a length of a frame member extending between the lift bar and the mounting beam. A vehicle mounting assembly is pivotally connected to the lift bar and able to mount the lift bar to an associated vehicle. The lift bar is movable relative to the vehicle mounting assembly about a third pivot axis parallel to a length of the lift bar.

In accordance with still another aspect of the present invention, an alignment means for aligning an implement onto a frame assembly is provided. More particularly, in accordance with this aspect of the invention, the alignment means includes an inclined surface and a stop at a first end of the inclined surface.

In accordance with still yet another aspect of the present invention, an assembly for mounting an associated implement on an associated vehicle is provided. More particularly, in accordance with this aspect of the invention, the assembly includes a first frame member and a first angled surface having a center line which makes an angle of between 5° and 85° relative to a generally horizontal plane.

In accordance with another aspect of the present invention, a mount/dismount assembly for mounting and dismounting an implement to and from a vehicle is provided. More particularly, in accordance with this aspect of the invention, the mount/dismount assembly includes a frame assembly and an implement assembly. The frame assembly is mounted on an associated vehicle. A lift assembly is operatively associated with the implement assembly and the frame assembly. The lift assembly has a lifting means for lifting and an attaching means for attaching. The lifting means is capable of lifting the lift assembly and the implement assembly upwardly until the attaching means engages the frame assembly thereby mounting an associated implement onto an associated vehicle.

In accordance with yet another aspect of the present invention, a frame assembly for mounting on an associated vehicle is provided. More particularly, in accordance with this aspect of the invention, the frame assembly includes a first angled surface wherein the first angled surface has a center line which makes an angle of between 5° and 85° with a generally horizontal plane.

In accordance with still another aspect of the present invention, a frame assembly for enabling the mounting of implements on an associated vehicle is provided. More particularly, in accordance with this aspect of the invention, the frame assembly includes first and second substantially vertical portions. A substantially horizontal member has a first end connected to an end of the first vertical member and a second end connected to an end of the second vertical member. First and second arms are provided wherein a first end of each of the arms is operatively connected to the frame assembly and the second end of each of the arms is operatively connected to an associated vehicle frame of the associated vehicle. The first and second arms have a height. The height of the first arm is less than six inches whereby a ground clearance of the associated vehicle is lowered by six inches or less due the presence of the frame assembly.

In accordance with still yet another aspect of the present invention, a mounting assembly for mounting a plow assembly onto an associated vehicle is provided so that the plow assembly remains essentially level when in a raised position. More particularly, in accordance with this aspect of the invention, the mounting assembly includes a frame member having a front end and a back end. The front end of the frame member is pivotably connected to plow and the back end of the frame member is pivotably connected to the associated vehicle.

BRIEF DESCRIPTION OF THE DRAWINGS

The invention may take form in various components and arrangements of components and in various steps and arrangements of steps. The drawings are only for purposes of illustrating a preferred embodiment and are not to be construed as limiting the invention.

PREFERRED EMBODIMENTS

Figure 1:
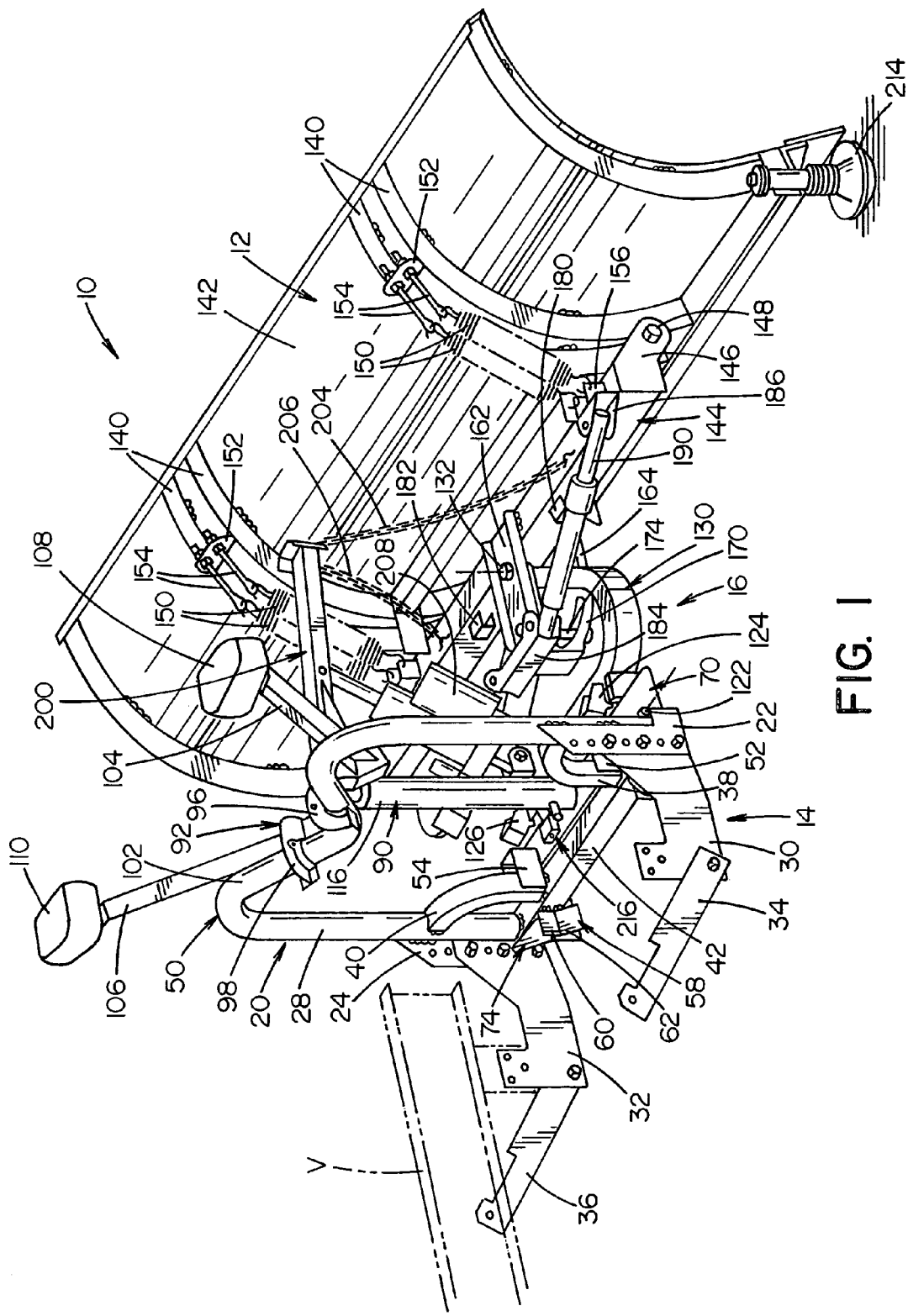
FIG. 1 is a rear perspective view of a plow mounting assembly showing a frame assembly capable of being semi-permanently connected to a vehicle and a blade assembly having a plow blade and a grasping assembly in a closed position releasably connected to the frame assembly in accordance with a preferred embodiment of the present invention.

Referring now to the drawings wherein the showings are for purposes of illustrating the preferred embodiment of the invention only and not for purposes of limiting the same, FIG. 1 shows a plow mounting device or assembly generally designated by reference numeral 10. The plow mounting assembly 10 allows a conventional plow blade 12 to be removably or detachably mounted to the front of an associated vehicle V (partially shown in FIG. 4). The invention enables the plow blade 12 to be selectively attached to the vehicle when it is anticipated that it might be desirable to use the plow blade 12 and selectively detached from the vehicle and stored when it is anticipated that the plow blade 12 will not be needed.

Figure 2:
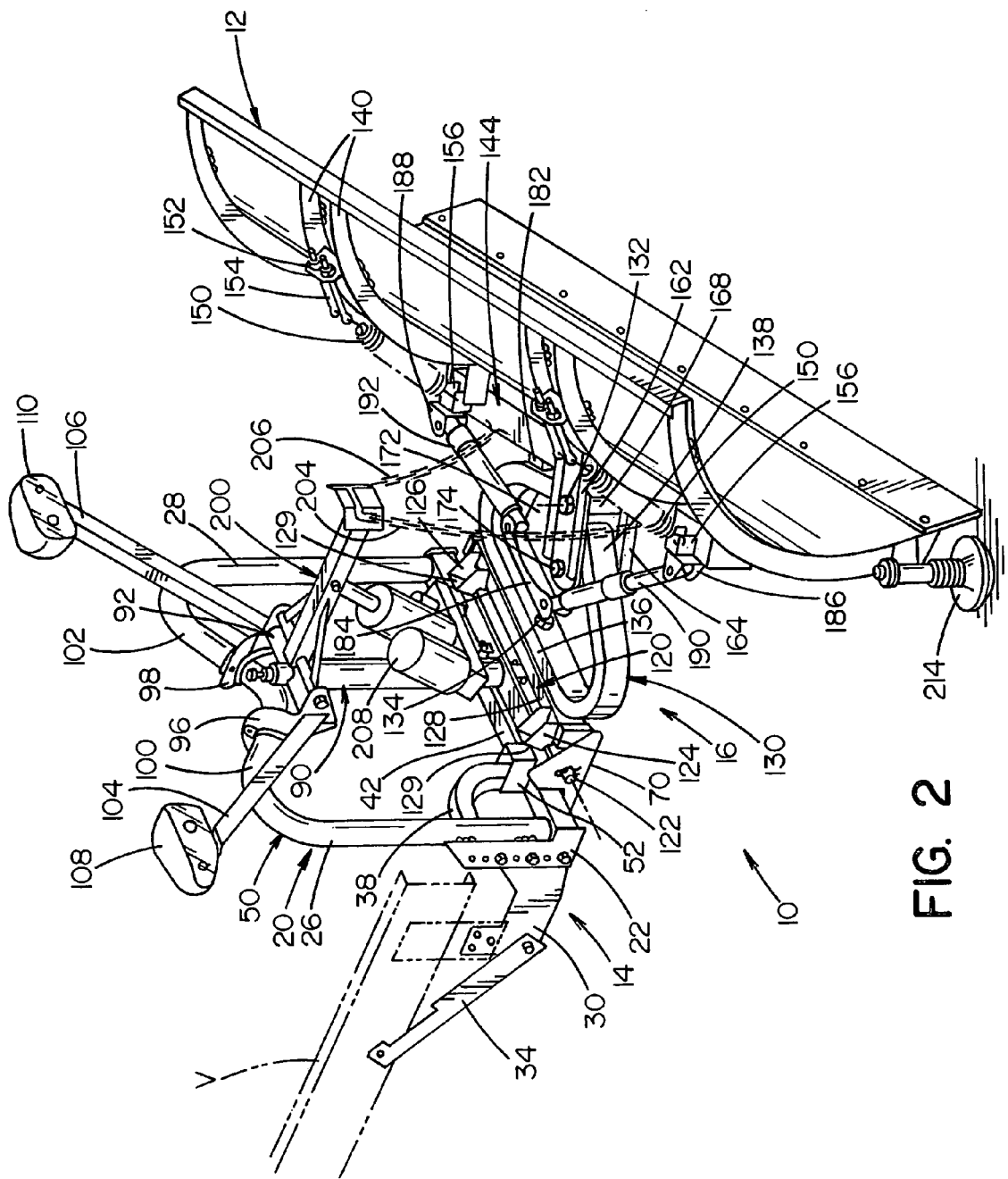
FIG. 2 is a front perspective view of the plow mounting assembly of FIG. 1 showing the blade assembly.
Figure 3:
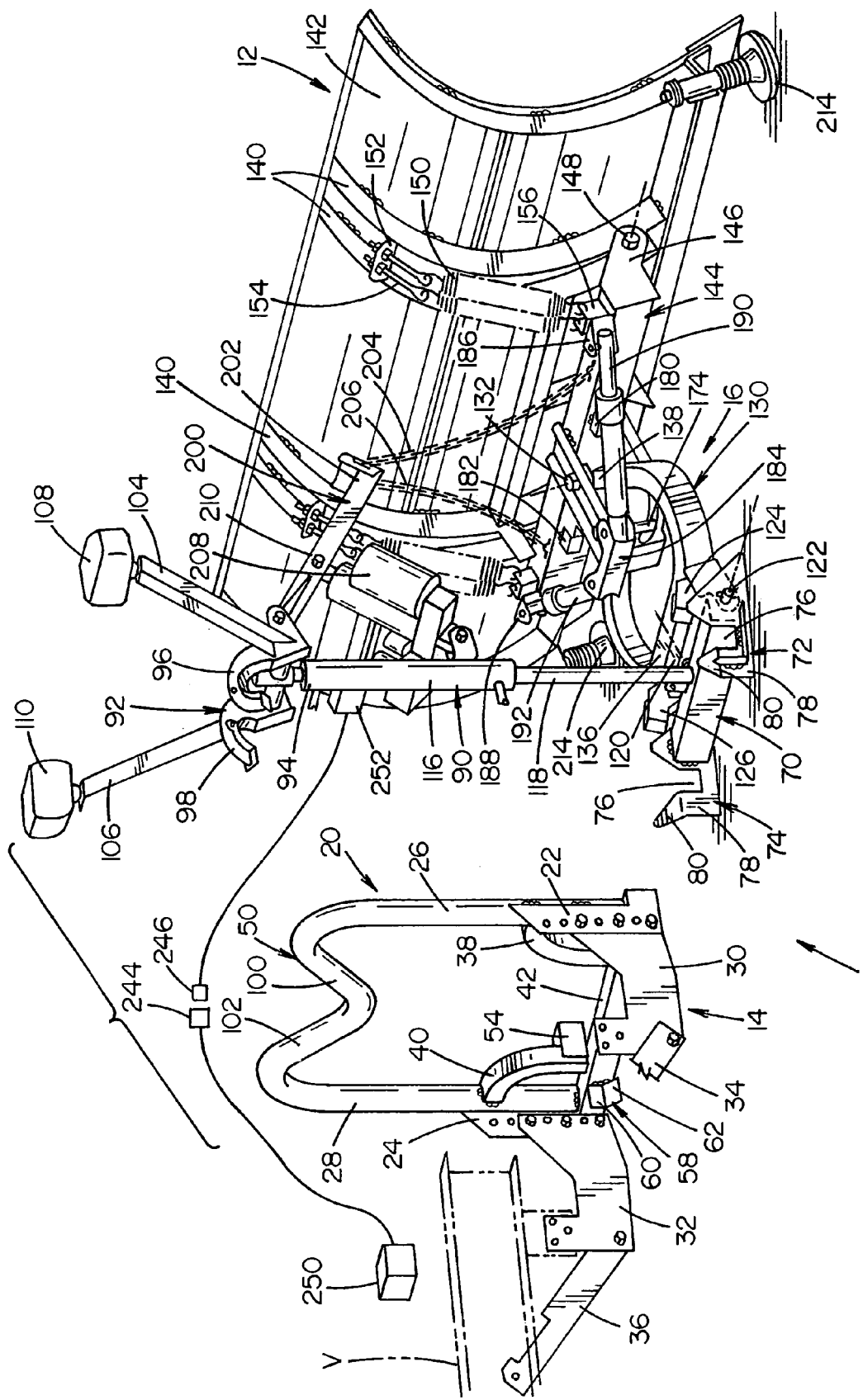
FIG. 3 is a rear perspective view of the plow mounting assembly of FIG. 1 showing the grasping assembly of the blade assembly in an open position and disconnected from the frame assembly.

With reference to FIGS. 1-8, and more specifically FIG. 3, the plow mounting assembly 10 generally includes a frame assembly 14 adapted to be semi-permanently connected or mounted directly on the front end of the vehicle V. The frame assembly 14 is a generally non-interfering structure when attached to the front of the vehicle, i.e., the frame assembly 14 does not interfere with functions of the vehicle. At least a portion of the frame assembly 14 can be coated with vinyl or chrome. Further, the frame assembly 14 can serve as a brush guard with its lower horizontal portion 42 and upper portion 50 when attached to the vehicle and the plow blade 12 is not mounted thereto.

The plow mounting assembly 10 further includes a blade or lift assembly 16 that carries the plow blade 12. As will be described in more detail below, the blade assembly 16 is selectively engageable or connectable to the frame assembly 14. Thus, when the frame assembly 14 is semi-permanently connected to the vehicle and the blade assembly 16 carries the plow blade 12, engagement between the blade assembly 16 and the frame assembly 14 serves to mount the plow blade 12 to the front of the vehicle.

More specifically, the frame assembly 14 includes a frame member 20 that, in the preferred embodiment, is shaped like the letter "M" and is oriented in a generally upright position. While the "M" shape is the preferred shape, other shapes are capable of carrying out the purposes of the invention. For example, a "V" shaped frame could be used and is considered within the scope of the present invention. A "V" shaped frame could be configured without vertical portions making up the "M" shaped frame of the preferred embodiment. Further, equivalent structures having only a single inclined or sloped surface (as opposed to the two inclined or sloped surfaces of the "M" shaped frame member 20) could also be made to work as equivalents.

Figure 5:
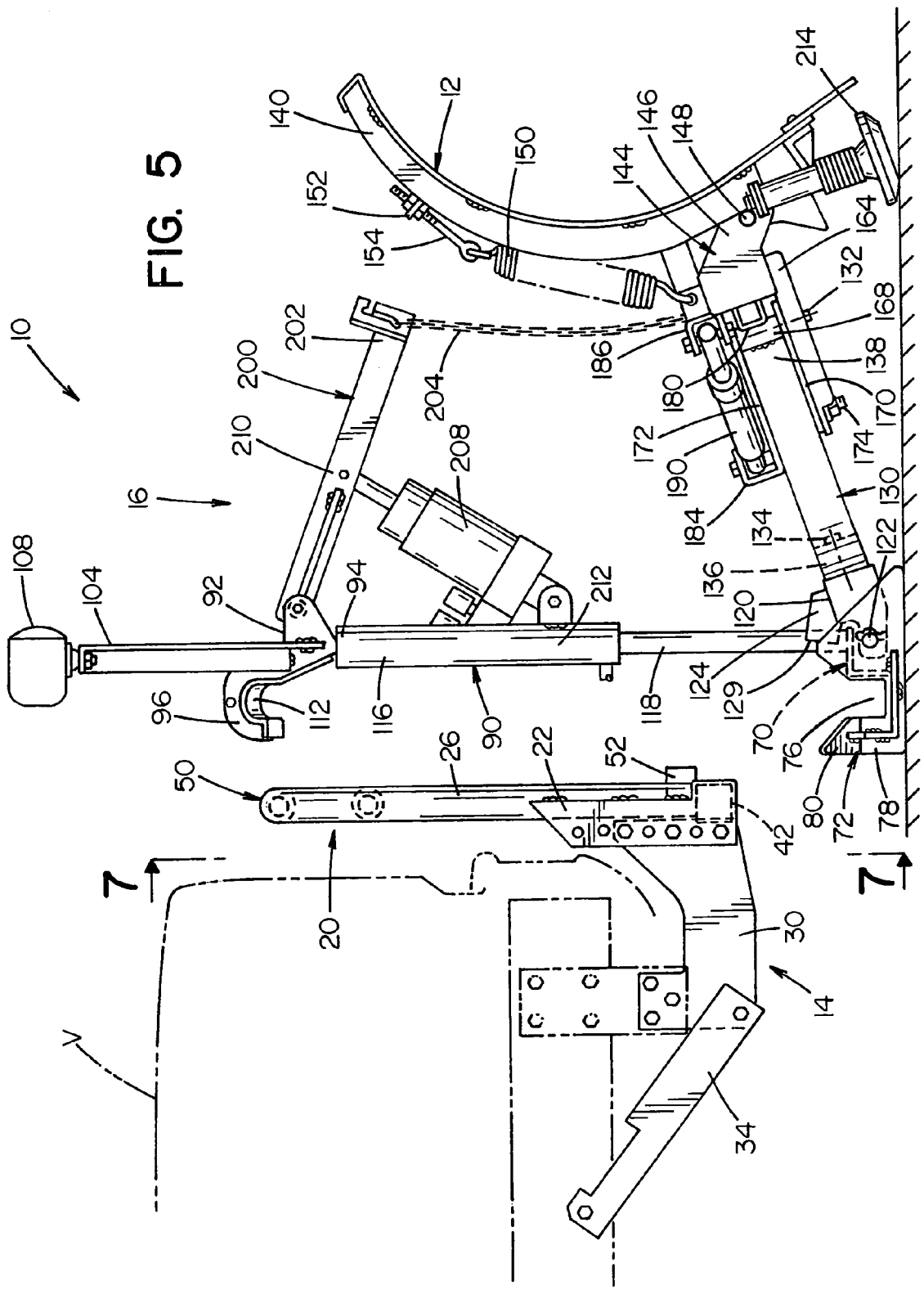
FIG. 5 is a side elevational view of the plow mounting assembly of FIG. 1 showing the frame assembly connected to the vehicle and the grasping assembly disconnected from the frame assembly.

With reference to FIGS. 3 and 5, a pair of flange members 22,24 extend from vertical portions 26,28 of the M-shaped frame 20. A pair of arms 30,32 having holes therethrough are connected, respectively, to each of the flange members 22,24. The arms 30,32 extend perpendicularly relative to the frame 20. Arm extensions 34,36 are pivotally connected to the arms 30,32 at the distal ends thereof. The arms 30,32 and arm extensions 34,36 are used to semi-permanently mount the frame assembly 12 to the vehicle V. The frame assembly 14 further includes reinforcing members 38,40 connecting the vertical portions 26,28 to a generally lower horizontal portion 42 of the M-shaped frame 20. The particular structure shown provides excellent ground clearance. More particularly, the height of the arms 30,32 is less than about six (6) inches, whereby a ground clearance of the associated vehicle is lowered by about six (6) inches or less due to the presence of the frame assembly.

An upper or M-shaped portion 50 of the frame 20 spaced from the lower portion 42 provides an aligning means or centering shape for aligning or centering the blade assembly 16 on the frame assembly 14 as will be described in more detail below. The frame 20 includes a pair of contact members or stops 52,54 for engaging a portion of the blade assembly 16. The contact members 52,54 extend perpendicularly relative to the frame 20 and in a direction opposite the arms 30,32. The contact members 52,54 are positioned immediately above the horizontal portion 42 and each extends generally from a respective one of the reinforcing members 38,40.

Figure 6:
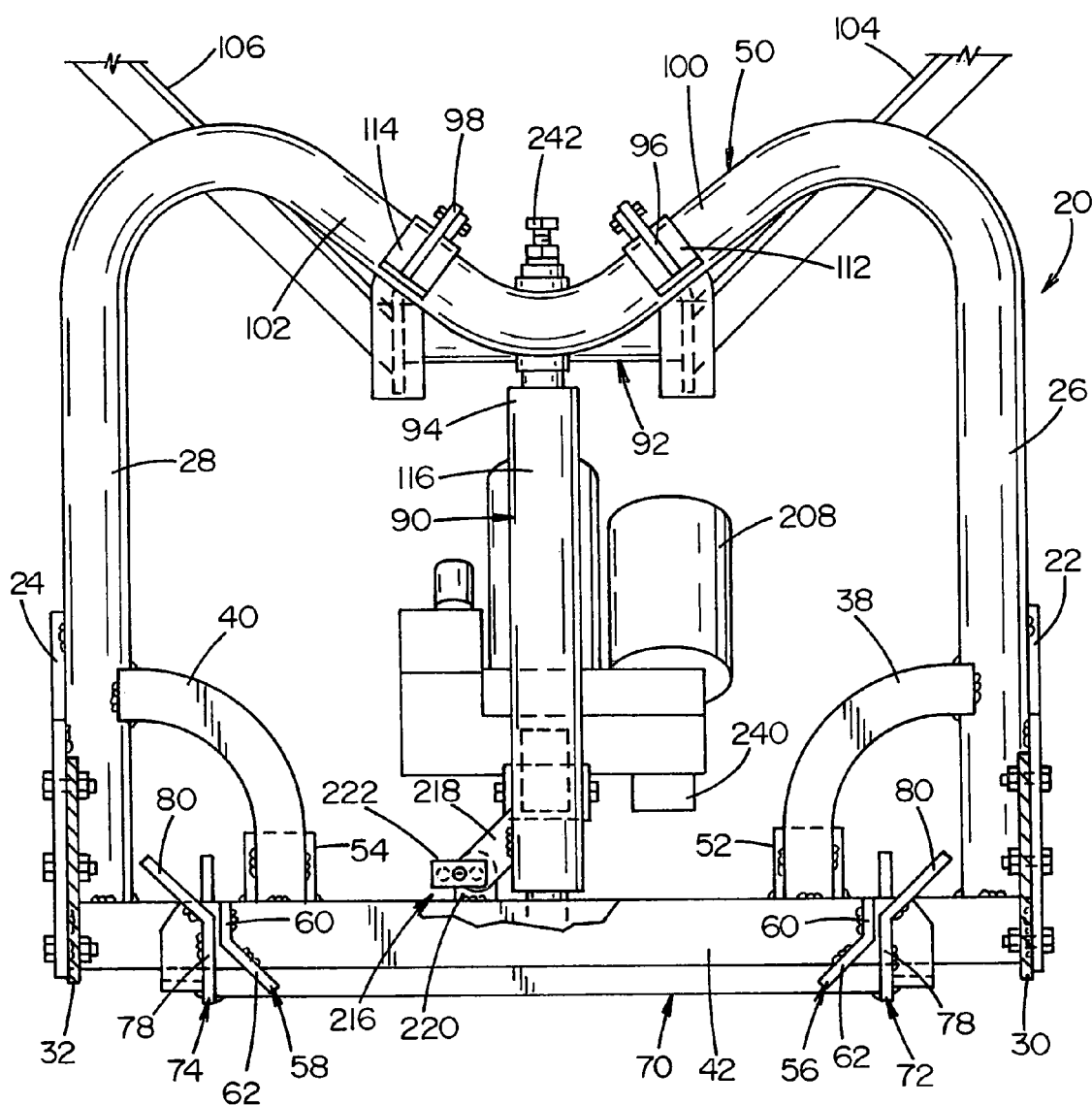
FIG. 6 is a partial rear sectional view taken along line 6-6 of FIG. 4 of the plow mounting assembly of FIG. 1 showing the grasping assembly in the closed position.

With reference to FIGS. 1 and 6, lower centering guides 56,58 are provided on the lower horizontal portion 42 on a side thereof opposite the contact members 52,54. Each of the lower centering guides 56,58, also referred to herein as guiding members, includes a vertical portion 60 and an angled portion 62. The centering guides 56,58 function to align and center the blade assembly 16 relative to the frame assembly 14 when the blade assembly 16 is being connected to or engaged with the frame assembly 14 and the blade assembly 16 is slightly misaligned or uncentered relative to the frame assembly 14. The contact members 52,54 function to maintain or limit the position of the blade assembly 16 relative to the frame assembly 14 when the two components 14,16 are connected.

With reference to FIGS. 3 and 5, the blade assembly 16 includes a lower engaging member 70 that abuts or contacts the frame assembly 14 when the blade assembly 16 is connected thereto. The engaging member 70 includes a first clasp or fastener that, in the illustrated embodiment, is a pair of upwardly extending clamps or hooks 72,74 spaced apart from one another. The hooks 72,74 each define a recess 76 appropriately shaped to engage and securely receive the lower horizontal portion 42 of the frame assembly 14. With reference to FIG. 6, the spacing between the hooks 72,74 is such that when the horizontal portion 42 is received in the recesses 76 the hooks 72,74 are slightly outside the centering guides 56,58. Each of the hooks 72,74 includes a vertical portion 78 and an angled portion 80. The angled portion 80 is approximately the same as or at an angle that substantially matches the angle of the angled portions 62 of the centering guides 56,58. The positioning between the guides 56,58 and the hooks 72,74 and the angled portions 62,80 function to center and align the blade assembly 16 relative to the frame assembly 14 when the frame assembly 14 is connected or being connected to the blade assembly 16.

With reference back to FIGS. 3 and 5, the blade assembly 16 further includes a grasping assembly for removably connecting to the frame assembly 14. The grasping assembly includes the lower engaging member 70, a telescoping cylinder 90 and an upper engaging member 92. The telescoping cylinder 90 extends vertically upward from the lower engaging member 70. The cylinder 90 is oriented in a position that is generally parallel to the upright frame 20 when the blade assembly 16 is connected to the frame assembly 14. The cylinder 90 is movable between a closed or collapsed position and an open or expandable position. In the preferred embodiment, the cylinder 90 is a conventional hydraulic cylinder actuated by a conventional hydraulic pump (shown schematically as a rectangle and labeled 240 in FIG. 6). The cylinder 90 can also be a conventional self-locking cylinder that locks in the open position or the closed position when the cylinder 90 is in one of these positions and the hydraulics of the cylinder are not actuated. Alternatively, the cylinder 90 could be any other actuator such as, for example, an acme screw with an electric motor.

The upper engaging member 92 is located at or adjacent an upper end 94 of the cylinder 90. The upper engaging member 92 includes a second clasp or fastener that, in the illustrated embodiment, is a pair of opposed, downwardly extending clamps or hooks 96,98 spaced apart from one another and angled to substantially match first and second angled sections 100,102 of the upper portion 50. The sections 100,102 together form a V-shape that generally centers the blade assembly 16 relative to the frame assembly 14. More specifically, the angled sections 100,102 are angled between about five (5) degrees and about eighty-five (85) degrees relative to their respective vertical portions 26,28 or a generally horizontal plane. The hooks 96,98 are appropriately positioned to engage the first and second angled sections 100,102 when the blade assembly 16 is connected to the frame assembly 14.

Figure 9:
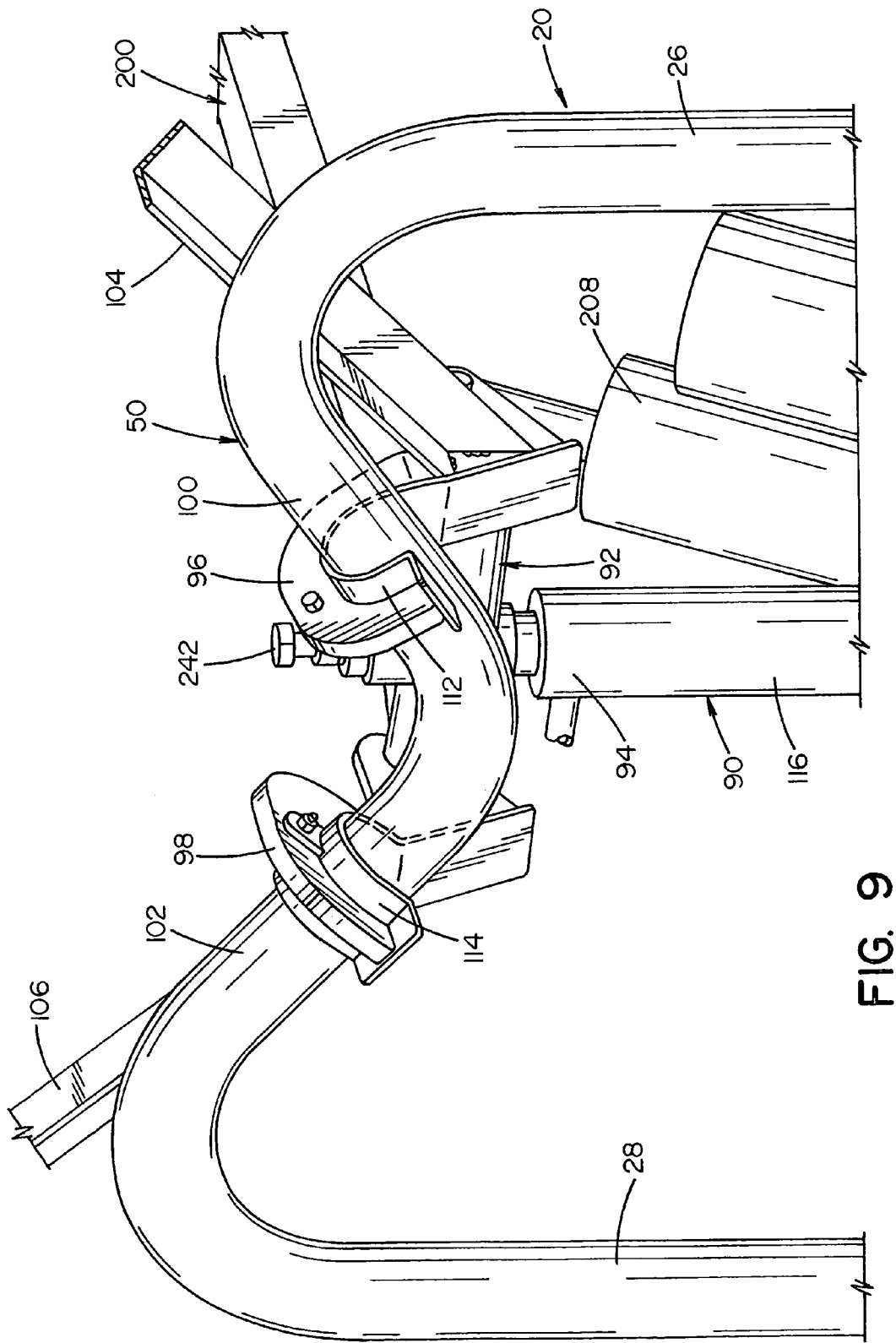
FIG. 9 is an enlarged partial rear perspective view of the plow mounting assembly of FIG. 1 showing a set of low friction inserts on upper hooks of the grasping assembly.

The upper engaging member 92 can additionally include arms 104,106 for supporting lights 108,110 at distal ends thereof. The lights 108,110 can be directed or positioned to illuminate an area beyond the plow blade 12 particularly when the plow blade 12 obstructs the lights of the vehicle V. With reference to FIG. 9, the hooks 96,98 can include protective inserts or pads 112,114 to prevent or reduce scratching of the M-shaped member 20 when connecting the blade assembly 16 to the frame assembly 14. In the preferred embodiment, the pads 112,114 are coated with a low friction material such as TEFLON™.

Thus, with reference back to FIGS. 3 and 5, the cylinder 90 extends between the upper hooks 96,98 and the lower hooks 72,74. More specifically, the cylinder 90 includes an elongated tubular portion 116 depending from the upper engaging member 92 and an elongated cylindrical portion 118 telescopingly received in the tubular portion 116 and extending from the lower engaging member 70. The cylindrical portion 118 extends from the tubular portion 116 when the grasping assembly is in the open position and is retracted within the tubular portion 116 when the grasping assembly is in the closed position.

With additional reference to FIG. 2, the blade assembly 16 further includes a lift bar 120 is pivotally connected to the lower engaging member 70 by a first pivot pin 122 that is generally parallel to a wheel axis of the vehicle and the width of the vehicle when the blade assembly 16 is connected to the frame assembly 14 on the vehicle V. The first pivot pin 122 includes a grease fitting which extends the useful life of the pivot pin connection. The lift bar 120 is generally oriented in a position parallel relative to the lower engaging member 70. As a result, the lift bar 120 and the plow blade 12 are able to pivot up and down relative to the lower engaging member 70, the front end of the vehicle and/or the ground thereby allowing the plow blade 12 to be raised and lowered relative to the ground.

The lift bar 120 includes a pair of stops 124,126 adjacent an upper side 128 of the lift bar 120 for limiting pivotal movement of the lift bar 120 relative to the engaging member 70. More specifically, the stops 124,126 are aligned with the stops or contact members 52,54 when the blade assembly 16 is connected to the frame assembly 14 and angled surfaces 129 of the stops 124,126 will abut vertical surfaces of the contact members 52,54 when the lift bar 120 is pivoted to a predetermined angle relative to the lower engaging assembly 70. The predetermined angle is determined by the angled surfaces 129 of the stops 124,126 and the distances between the stops 124,126 and the contact members 52,54.

A horizontal plow frame member 130 constructed of formed rectangular tubing is rotatably connected to the plow blade 12 by a second pivot pin 132 and to the lift bar 120 by a third pivot pin 134. Like the first pivot pin 122, the second and third pivot pins 132,134 each include a grease fitting which extends the useful lives of the second and third pivot connections. The third pivot pin 134 is defined along a portion of a longitudinal axis extending along the longitudinal length of the vehicle and allows the frame member 130 to pivot rotatably relative to the lift bar 120. More specifically, the third pivot pin 134 allows the plow blade 12 to rotate about said longitudinal axis for allowing the plow blade 12 to remain generally parallel to the ground.

The frame member 130 is generally tear drop shaped or candy kiss shaped and is oriented generally perpendicularly relative to the frame 20 when the blade assembly 16 is connected to the frame assembly 14. With additional reference to FIG. 3, the frame member 130 includes a rear portion 136 that is substantially flat or straight and positioned adjacent the lift member 120. The rear portion 136 is the portion of the frame member 130 that is rotatably connected to the lift bar 120. Specifically, the rear portion 136 is rotatably connected to the lift bar. 120 adjacent a center of the lift bar 120 and the rear portion 136. The frame member 130 further includes a front portion 138, also referred to herein as an apex portion, that is generally pointed and positioned opposite the rear portion 136. Rounded portions connect or extend between the base portion 136 and side portions that form the pointed portion 138. As already discussed, the third pivot pin 134 connecting the frame member 128 to the lift bar 120 allows the plow blade 12 to rotatably pivot and thereby follow the contour of the road.

With reference to FIG. 1, the plow blade 12 includes ribs 140 vertically oriented on a non-plowing surface 142 of the blade 12. With additional reference to FIG. 4, a plow mounting beam 144 is connected to the plow blade 12 and extends horizontally along the surface 142. The beam 144 includes a plurality of flanges 146 that pivotally connect to the ribs 140 with the use of suitable fasteners such as threaded connectors 148. The relatively wide mounting beam 144 provides increased rigidity to the blade assembly 16. Tensioning springs 150 also connect the plow blade 12 to the mounting beam 144. More particularly, the plow blade 12 includes spring mounting flanges 152 positioned above the connections between the ribs 140 and the flanges 146. The spring mounting flanges 152 receive suitable spring mounting or tensioning bolts 154 therethrough that connect to first ends of the springs 150. The second ends of the springs 150 connect to spring mounting flanges 156 formed integrally on the mounting beam 144.

With reference to FIG. 2, the mounting beam 144 is rotatably or pivotally connected to the pointed portion 138 of the frame member 130. More specifically, the-mounting beam 144 includes an upper arm 162 and a lower arm 164. The arms 162,164 extend away from the plow blade 12 in a direction generally perpendicular relative to a longitudinal length of the mounting beam 144. The second pivot pin 132 rotatably connects the arms 162,164 of the mounting beam 144 to the frame member 130. Specifically, the second pivot pin 132 extends through the upper arm 162, through a sleeve 168 defined in the pointed portion 138 of the frame member 130 and through the lower arm 164 thereby allowing the mounting beam 144 to pivot relative to the frame member 130 which allows the plow blade 12 to be positioned at an angle relative to the front of the vehicle. More specifically, the second pivot pin 132 allows the plow blade 12 to pivot left and right relative to the front end of the vehicle V. The lengths of the upper and lower arms 162,164 correspond to a maximum pivot angle allowed by the mounting beam 144 and the plow blade 12.

Figure 4:
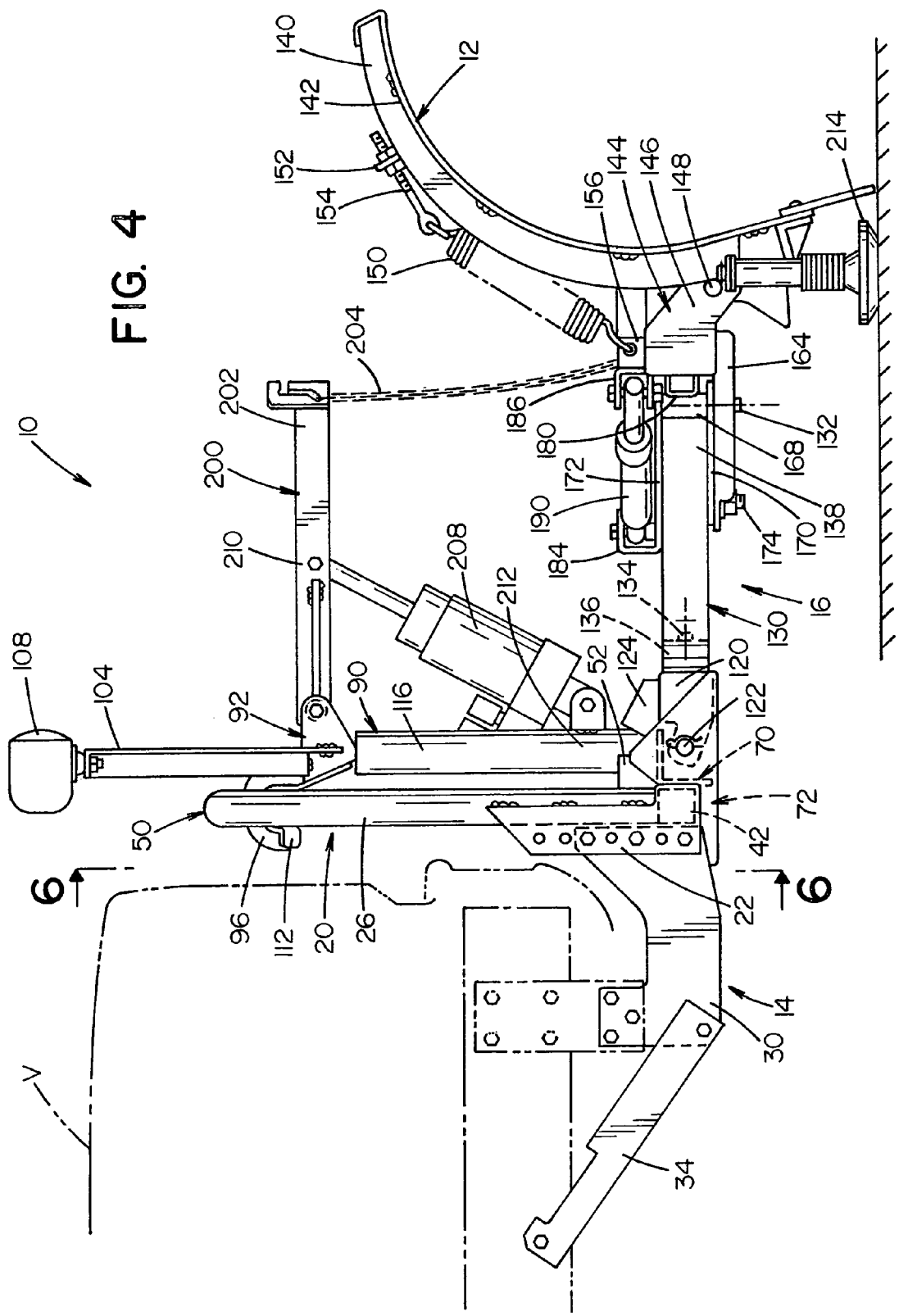
FIG. 4 is a side elevational view of the plow mounting assembly of FIG. 1 showing the frame assembly connected to a vehicle.

With reference to FIG. 4, a lower guide plate 170 is sandwiched between the sleeve 168 and the lower arm 164. An upper guide member 172 is sandwiched between the sleeve 168 and the upper arm 162. The guide plate 170 and the guide member 172 extend into a center portion of the frame member 130 and remain fixed relative to the frame member 130. A guide pin 174 (see also FIG. 1) also rotatably connects the arms 162,164 and the frame member 130 at a preselected distance beyond the second pivot pin 132. The pin 174 extends through the arms 162,164 at a distal location on the arms 162,164 relative to the second pivot pin 132 and passes through the center portion or interior of the frame member 130. The guide plate 170 and the guide member 172 each include respective slots that receive the second pivot pin 174 therethrough. The slots guide the pivot of the mounting beam 144 relative to the frame member 130 and provide stops or limits to the degree of pivot permitted between the beam 144 and the frame member 130.

Additionally, with reference to FIG. 3, pivoting is limited by stops or protrusions 180,182 extending from the mounting beam 144. Rubber members or TEFLON™ inserts may be added to or substituted for the stops 180,182 to cushion the impact caused when the frame member 130 engages one of the stops 180,182. More specifically, the mounting beam 144 and the plow blade 12 are pivotally movable about the second pivot pin between a first position wherein the mounting beam 144 engages one of the side portions of the frame member 130 and a second position wherein the mounting beam 144 engages the other of the side portions of the frame member 130. In the first position, the stop 180 engages the frame member 130 and in the second position the stop 182 engages the frame member 130. Alternatively, any rubberized member, coating or the like may be used to cushion the engagement between the stops 180,182 and the frame member 130. The stops 180,182 limit the amount of angular displacement of the plow blade 12 relative to the frame member 130 which remains parallel with the front of the vehicle to which the plow blade 12 is mounted. Alternatively, the stops could be disposed on the frame member 130.

With reference to FIG. 2, adjacent a side of the guide member 172 that is opposite the pin 174, a channel 184 is defined. A pair of channel members 186,188 is disposed on the mounting beam 144. The first channel member 186 is at a first position on the mounting beam 144 spaced apart in a first direction from the upper arm 162. The second channel member 188 is at a second position on the mounting beam 144 spaced apart in a second, opposite direction from the upper arm 162. A pair of telescoping cylinders 190,192 connects the channel members 186,188 to the channel 184. More specifically, the first cylinder 190 extends between the first channel member 186 and one end of the channel 184. The second cylinder 192 extends between the second channel member 188 and the other end of the channel 184. The first and second cylinders 190,192 are pivotally connected at their sides to the channel 184 and channel members 186,188.

As is known in the art, the cylinders 190,192 may be hydraulically driven to pivot the plow blade 12 about the second pivot pin 132.

With reference to FIGS. 1 and 5, a lift arm 200 is pivotally connected to the upper engaging member 92 of the grasping assembly and extends outwardly therefrom in the direction of the plow blade 12. At or near a distal end 202 of the lift bar 200, a pair of chains 204,206 connect the lift bar 200 to the mounting beam 144. More specifically, the distal end 202 of the lift bar 200 is positioned or extends beyond the first pivot pin 122 and the chains 204,206 extend downwardly to the beam 144 to maintain the plow blade 12 in a generally horizontal orientation even when the blade 12 is pivoted or angled relative to the frame member 132. A lift unit 208 is connected to the lift arm 200 and the vertical cylinder 90. Specifically, the lift unit 208 pivotally connects to a center portion 210 of the lift arm 200 and pivotally connects to center portion 212 of the vertical cylinder 90. The lift unit 208 is adapted to move the lift arm 200 to thereby move the plow blade 12 up and down, i.e., pivoting about the first pivot pin 122. At the top end of the vertical cylinder 90, an adjustment mechanism, such as an adjustment screw 242, enables the mounting assembly to adjust to differing heights of various vehicles.

With the frame assembly 14 semi-permanently mounted or attached to the vehicle as described above, the blade assembly 16 can be readily connected or mounted to the frame assembly 14 on the vehicle. With reference to FIG. 3, the blade assembly 16 is shown resting on the ground. The vertical cylinder 90 is in the expanded position and, thus, the grasping assembly is in the open position which is required for securing the blade assembly 16 to the frame assembly 14 because the upper and lower hooks are separated from one another a distance sufficient to allow the frame assembly 14 to be moved adjacent the blade assembly 16.

When the frame assembly 16 is resting on the ground with the cylinder 90 in its expanded position, the lift bar 120 contacts and directly rests on the ground and a pair of plow blade supports or shoes 214 also contact and directly rest on the ground. The shoes 214 keep the blade 12 from engagement with the ground and protect the blade 12 while the blade assembly 16 is connected to the frame assembly 14. More specifically, the shoes 214 are positioned adjacent each lateral side edge of the plow blade 12 and adjacent the bottom edge of the plow blade 12. The shoes 214 are positioned to scrape the ground when the blade 12 is mounted to a vehicle to guide the blade along the ground. Further, the shoes 214 are positioned to guide the lateral side edges of the blade 12 along curbs. Additionally, the shoes 214 can be rotatably mounted to spin as they ride along curbs.

Also shown in FIG. 3, are limited electrical connections for operating the inventive method and apparatus. The electrical connections are shown schematically for ease of illustration. More specifically, certain electronics 250 (known to the industry) are mounted on the vehicle and are connected to certain electronics 252 (known to the industry) that are mounted on the blade assembly 16. The electronics 250,252 are selectively operatively connected and connectable by manually connecting first plug 244 to second plug 246. Through the electrical connections, the cylinder 90 can be operated and/or controlled by a control unit (not shown) located in the cabin of the vehicle V.

To mount or connect the blade assembly 16 to the frame assembly 14, the vehicle with the frame assembly 14 attached thereto drives or moves toward the blade assembly 16 until the frame assembly 14 contacts the blade assembly 16 or is very near to or adjacent the blade assembly 16, i.e., the vehicle pulls forward until the M-shaped frame 20 is positioned or aligned with the recesses 76 of the lower hooks 72,74 and the recesses of the upper hooks 96,98. Further, the vertical centerline of the M-shaped frame 20 should be generally aligned or only slightly misaligned relative to the vertical cylinder 90. The grasping assembly may then be moved toward its closed or collapsed position which allows the hooks 72,74,96,98 to capture or grasp the M-shaped frame 20.

As the cylinder 90 is collapsed, the upper hooks 96,98 engage the angled portions 100,102 of the M-shaped frame 20. Due to the angled portions 100,102 and the angled orientation of the upper hooks 96,98, the blade assembly 16 is urged to a centered position relative to the frame assembly 14. Further, as the cylinder 90 is collapsed, the lower hooks 72,74 engage the lower horizontal portion 42 of the frame assembly 14 and the lower engaging member 70 rises off the ground. More specifically, if the blade assembly 16 is slightly misaligned relative to the frame assembly 14, the angled portions 80 engage the lower centering guides 56,58 and are urged into a centered position on the frame assembly 14. Thus, when the grasping assembly is in its closed position, i.e., the cylinder 90 is collapsed, the blade assembly 16 is centered and locked to the frame assembly 14 and centrally positioned on the vehicle. Notably, the grasping assembly removably connects to the frame assembly 14 without the use of pins or levers, such as those used in the prior art patents discussed above.

Figure 7:
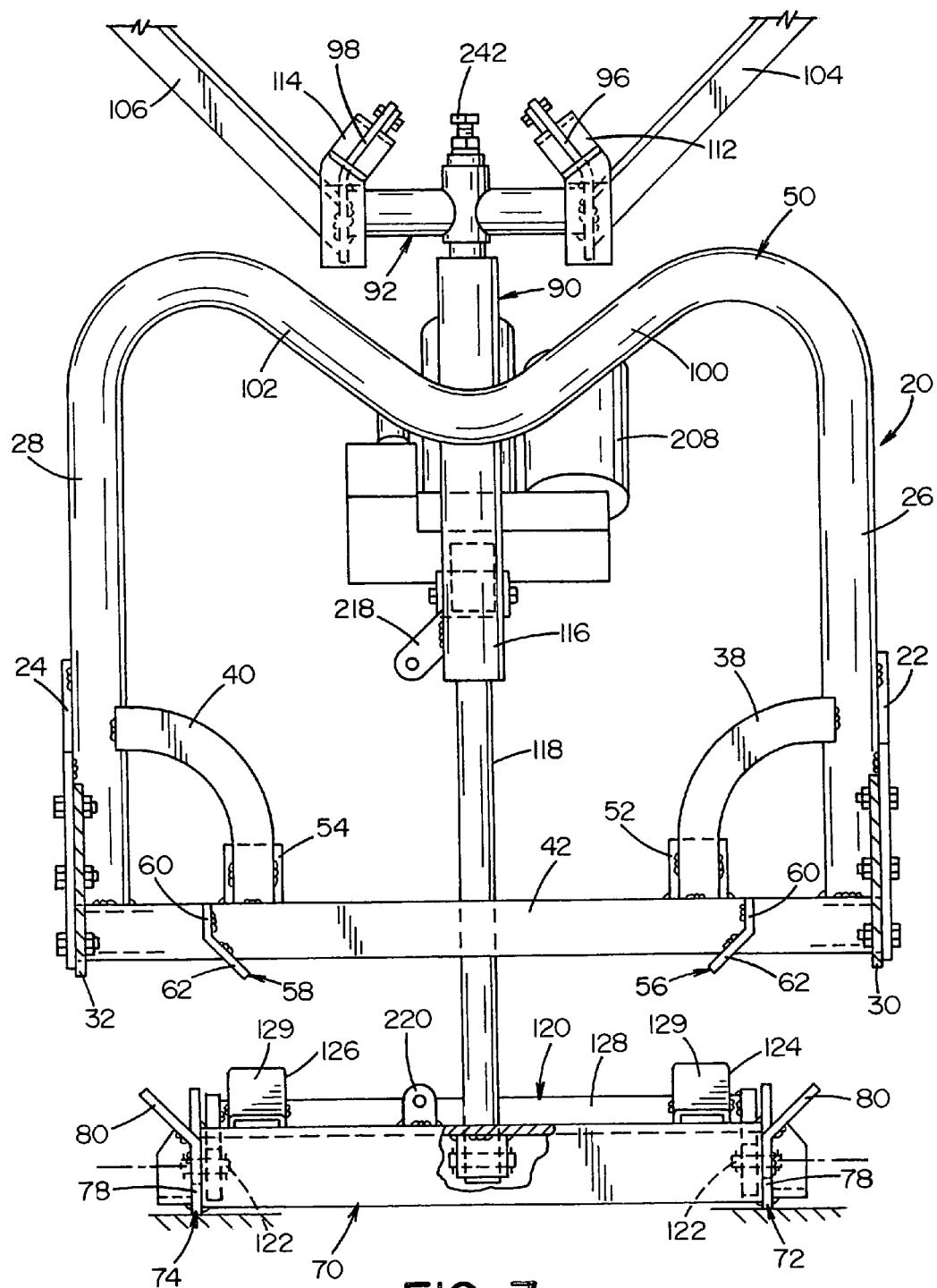
FIG. 7 is a partial rear sectional view taken along line 7-7 of FIG. 5 of the plow mounting blade assembly of FIG. 1 showing the grasping assembly in the open position.
Figure 8:
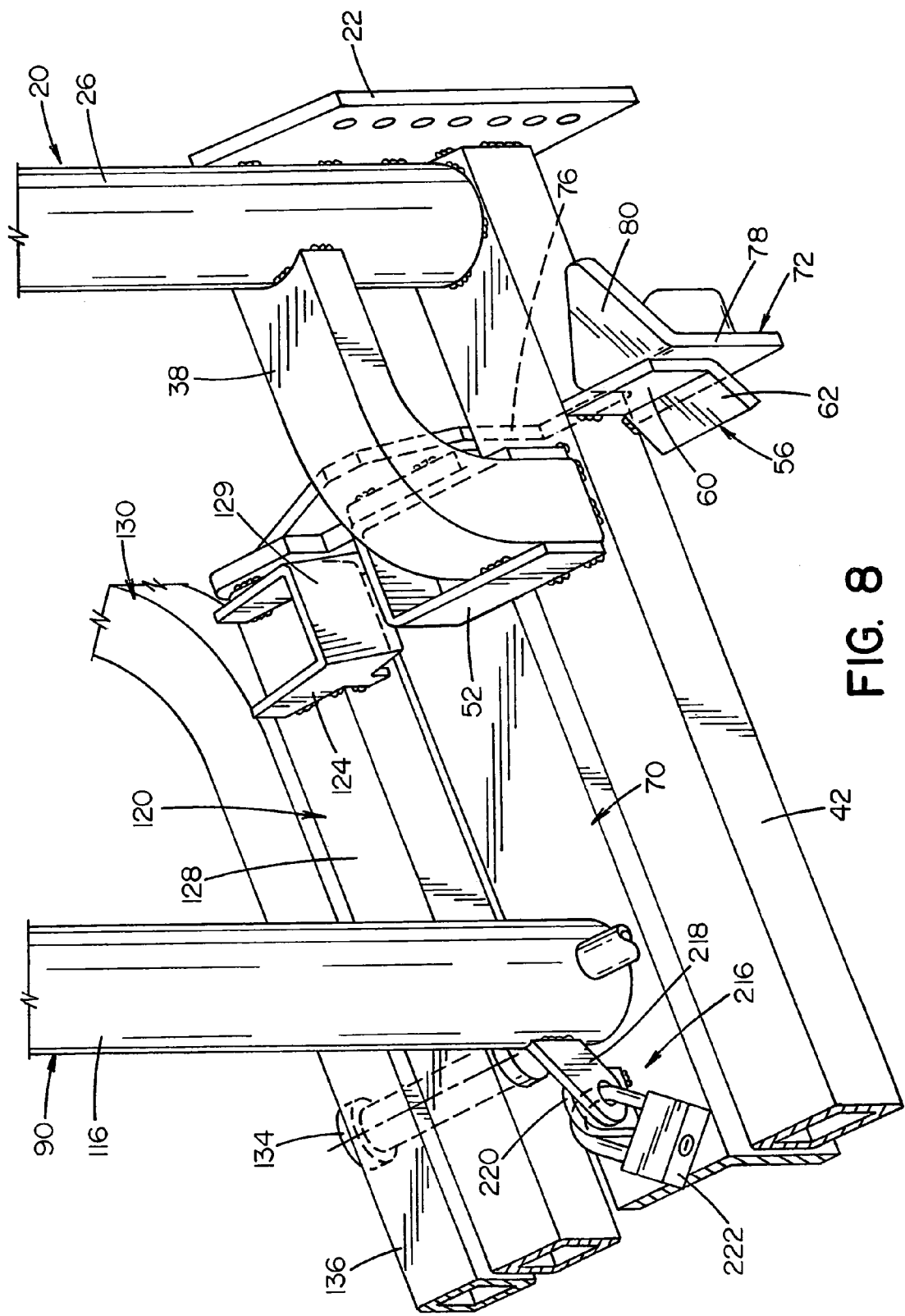
FIG. 8 is an enlarged partial rear perspective view of the plow mounting assembly of FIG. 1 showing a locking device.

To maintain the cylinder 90 in its collapsible position, with reference to FIGS. 6, 7 and 8, a locking means 216 is provided for locking the grasping assembly in its closed position. In the embodiment herein illustrated and described, the locking means is a locking device including a first locking arm or tab member 218 and a second locking arm or tab member 220. The arms 218,220 each have a throughole. More specifically, the first locking arm 218 extends from a distal end of the tubular portion 116 of the cylinder 90. The second locking arm 220 is positioned adjacent the lower hooks 72,74 on the lower engaging member 70. The holes of the first and second locking arms 218,220 are in registry with one another, i.e., aligned, when the grasping assembly is in the closed position. A conventional padlock 222 can be inserted through the aligned holes to lock the cylinder 90 in its closed position which thereby locks the blade assembly 16 to the M-shaped frame 20 of the frame assembly 14. The padlock 222 may be used to prevent unauthorized and/or undesired removal of the blade assembly 16 from the frame assembly 14 and can also serve to deter individuals from tampering with the mounting device 10. With additional reference to FIG. 7, the arms 218,220 are spaced apart from one another when the grasping assembly is in the open position. Of course, other types of locking devices could be used as the locking means and all such locking devices are to be considered within the scope of the present invention.

With reference to FIG. 5, the frame assembly 14 and the blade assembly 16 can be connected to one another as described above but the plow blade 12 will still be resting on the ground. To raise the plow blade 12, the lift unit 208 is activated. The lift unit 208, when activated, causes the lift arm 200 to pivot relative to the upper engaging member 92 which in turn raises the mounting beam 144 via the chains 204,206. This movement lifts the blade 12 off the ground, i.e., the blade, the frame 130 and the lift bar 120 pivot relative to the lower engaging member 70. As the blade 12 is lifted, the frame member 130 pivots or floats relative to the lift bar 120 to position the blade 12 parallel to the ground. FIG. 4 illustrates the frame assembly 14 connected to the blade assembly 16.

This configuration provides heretofore unavailable leveling of a plow in an upright position. When the operator is driving the vehicle V with the plow 12 in the raised position, the plow assembly remains essentially level, rather than dipping to one side. This valuable quality to obtained by causing the frame member 136 to be pivotably connected to the vehicle V by the first and third pivot pins 122,134 and to the plow by the second pivot pins 132.

To disengage, dismount or disconnect the blade assembly 16 from the frame assembly 14, the lift unit 208 is activated in reverse. The supports 214 of the blade 12 will again rest on the ground as will the lower engaging member 70. If the grasping assembly is locked in the closed position, then the locking means needs to be removed, i.e.; the lock 222 is removed from the aligned holes. Next, the grasping assembly is moved to its open position by moving the cylinder 90 to its expanded or open position. In the open position, the upper hooks 96,98 and the lower hooks 72,74 are separated from one another a distance sufficient to allow the blade assembly 16 to be separated from the frame assembly 14. The vehicle V with the frame assembly 14 mounted therein can then be backed away or moved from the blade assembly 16.

When the blade assembly 16 is disconnected from the frame assembly 14 and resting on the ground, the cylinder 90 may be optionally moved to a collapsed position and locked to prevent unauthorized and/or undesired use of the blade assembly 16. Thus, the holes of the tab members 218,220 are again in registry with one another when the grasping assembly is in the closed position and the lock 222 can be inserted through the holes.

In summary, therefore, the inventive method and apparatus enables one to mount and dismount an implement, such as a snow plow, from a vehicle, such as a pickup truck, with a heretofore unknown simplicity. The method of mounting the plow basically includes the steps of driving the vehicle toward the blade assembly until the frame assembly mounted on the front of the vehicle is in operative proximity to the blade assembly. Generally, that proximity is established by just touching the blade assembly with the frame assembly. Sometimes this is easily determined by the headlights on the frame assembly moving slightly as contact is made. Next, the electrical connections 244,246 are connected and a switch is activated that starts the hydraulic motor on the blade assembly. The telescoping cylinder 90 then retracts, causing the hooks 96,98 to hang the blade assembly onto the frame assembly. As the telescoping cylinder 90 continues to retract, the hooks 72,74 on the lower engaging member 70 engage and finish securing the blade assembly to the frame assembly.

To dismount the plow, the process is reversed. The vehicle is driven to where the plow assembly is to be stored. The switch is activated to cause the telescoping cylinder to extend. The cylinder extends, thereby releasing the hooks 72,74 on the lower engaging member 70. The lower engaging member 70 now operates as a "foot" and supports the blade assembly. The telescoping cylinder 90 continues to extend until the hooks 96,98 are released from the frame assembly 14. At this point, the electrical conduit is broken by separating the electrical connections 244,246 and the vehicle can be driven off.

In the preferred embodiment, the blade assembly 16 has been described as including the grasping assembly that removably connects to the frame assembly 14 semi-permanently mounted to the vehicle V. However, in alternate embodiments, other methods and assemblies can be used to connect the blade assembly 16 to the vehicle V. The blade assembly 16 can include, for example, a vehicle mounting assembly that connects the blade assembly 16 to the vehicle V with the use of pins or levers, semi-permanently connects the blade assembly 16 to the vehicle, etc. Such arrangements may be without the benefits and advantages of the grasping assembly and frame assembly described in reference to the preferred embodiment. Nonetheless, these arrangements may still be able to take advantage of the three pivot connection between the snow blade 12 and the vehicle which allows the plow blade 12 to float to a level on parallel position relative to a surface being plowed. It is to be appreciated that all such arrangements are to be considered within the scope of the present invention.

The invention has been described with reference to the preferred embodiment. Obviously, modifications and alterations will occur to others upon reading and understanding the preceding detailed description. It is intended that the invention be construed as including all such modifications and alterations insofar as they are within the scope of the appended claims and the equivalents thereof.

Having thus described the preferred embodiment, the invention is now claimed to be:

1. A plow mounting assembly for removably attaching a plow blade to the front end of a vehicle, comprising:
   a frame assembly semi-permanently connected to a front end of an associated vehicle;
   blade assembly comprising a plow blade and a grasping assembly in a closed position removable connected to the frame assembly;
   at least one centering guide for centering the blade assembly relative to the plow assembly; and
   wherein the at least one centering guide is a pair of upper hooks of the grasping assembly and a corresponding V-shaped portion of the frame assembly that urges the hooks to a centered position on the frame assembly when the plow blade is connected to the vehicle.

2. The assembly of claim 1 further comprising:
   a mounting beam attached to a nonplowing surface of an associated plow blade;
   a frame member pivotally connected to the mounting beam and oriented generally perpendicular relative to the height of the associated plow blade, the mounting beam movable relative to the frame member about a first pivot axis parallel to said height of the associated plow blade;
   a lift bar pivotally connected to the frame member, the frame member moveable relative to the lift bar about a second pivot axis parallel to a length of the frame member extending between the lift bar and the mounting beam; and
   a vehicle mounting assembly pivotally connected to the lift bar and able to mount the lift bar to an associated vehicle; the lift bar moveable relative to the vehicle mounting assembly about a third pivot axis parallel to a length of the lift bar.

3. The assembly of claim 2 wherein the frame member is constructed of formed rectangular tubing.

4. The assembly of claim 2 wherein the mounting beam includes a plurality of flanges that pivotally connect to the plow blade.

5. The assembly of claim 2 further comprising at least one tensioning spring that connects the plow blade to the mounting beam.

6. The assembly of claim 2 wherein the lift bar includes a pair of stops for limiting pivotal movement of the lift bar relative to an engaging member.

7. A plow mounting assembly for removably attaching a plow blade to the front end of a vehicle, comprising:
   a frame assembly semi-permanently connected to a front end of an associated vehicle;
   blade assembly comprising a plow blade and a grasping assembly in a closed position removable connected to the frame assembly;
   at least one centering guide for centering the blade assembly relative to the plow assembly; and,
      wherein the grasping assembly includes a first clamp and a second clamp spaced from the first clamp, and the first clamp is a pair of spaced hooks each having a vertical portion and an angled portion, the frame assembly includes a pair of guiding members forming the at least one centering guide and each having a vertical portion and an angled portion, when the plow blade is connected to the frame assembly and misaligned relative to the frame assembly, the hooks engage the guiding members and urge the plow blade to a centered position relative to the frame assembly.

8. The assembly of claim 7 further comprising:
   a mounting beam attached to a nonplowing surface of an associated plow blade;
   a frame member pivotally connected to the mounting beam and oriented generally perpendicular relative to the height of the associated plow blade, the mounting beam movable relative to the frame member about a first pivot axis parallel to said height of the associated plow blade;
   a lift bar pivotally connected to the frame member, the frame member moveable relative to the lift bar about a second pivot axis parallel to a length of the frame member extending between the lift bar and the mounting beam; and
   a vehicle mounting assembly pivotally connected to the lift bar and able to mount the lift bar to an associated vehicle; the lift bar moveable relative to the vehicle mounting assembly about a third pivot axis parallel to a length of the lift bar.

9. The assembly of claim 8 wherein the frame member is constructed of formed rectangular tubing.

10. The assembly of claim 8 wherein the mounting beam includes a plurality of flanges that pivotally connect to the plow blade.

11. The assembly of claim 8 further comprising at least one tensioning spring that connects the plow blade to the mounting beam.

12. The assembly of claim 8 wherein the lift bar includes a pair of stops for limiting pivotal movement of the lift bar relative to an engaging member.

13. A plow mounting assembly for selectively connecting, disconnecting and reconnecting a plow blade to a vehicle, comprising:
   a frame semi-permanently mounted on the vehicle;
   a plow frame member having a forward end and a rearward end;
   a plow blade pivotally connected to the plow frame member adjacent the forward end for allowing the plow blade to be positioned at varying angles relative to a front of a vehicle when the plow blade is connected to the vehicle;
   a lift bar pivotally connected to the frame member adjacent the rearward end for allowing the plow blade to float to a position generally parallel with the ground when the plow blade is connected to the vehicle;
   an engaging member pivotally connected to the lift bar allowing the plow blade to be positioned at varying distances from the ground:
   a first clamp connected to the engaging member adjacent the rearward end of the plow frame member;
   a second clamp spaced vertically upward from the first clamp; and
   a hydraulic cylinder between the first and second clamps and selectively movable between an open position and a closed position, in the open position the first and second clamps are spaced a sufficient distance apart to allow the frame semi-permanently mounted on the vehicle to move to a first position between the clamps and a second position away from the clamps, and in the closed position the first and second clamps are capable of holding the frame when the frame is in the first position between the clamps to thereby connect the plow blade to the vehicle;
   a guide for centering the plow blade on the frame when the plow blade is connected to the vehicle;
   wherein the second clamp is a pair of hooks and the guide is the hooks and a corresponding V-shaped portion of the frame that urges the hooks to a centered position on the frame when the plow blade is connected to the vehicle.

14. An assembly having a plow blade connected thereto, the assembly comprising:
   a mounting beam attached to a nonplowing surface of an associated plow blade;
   a frame member pivotally connected to the mounting beam and oriented generally perpendicular relative to the height of the associated plow blade, the mounting beam movable relative to the frame member about a first pivot axis parallel to said height of the associated plow blade;
   a lift bar pivotally connected to the frame member, the frame member moveable relative to the lift bar about a second pivot axis parallel to a length of the frame member extending between the lift bar and the mounting beam; and
   a vehicle mounting assembly pivotally connected to the lift bar and able to mount the lift bar to an associated vehicle; the lift bar moveable relative to the vehicle mounting assembly about a third pivot axis parallel to a length of the lift bar
   wherein the frame member is generally tear drop shaped including arcuate portions that connect a base portion to side portions
   wherein the side portions form a pointed portion that is pivotally connected to the mounting beam.

* * * * *